Jan. 2, 1934.  E. D. JANES  1,942,171
SEPARABLE SNAP FASTENER SOCKET
Filed Feb. 6, 1932
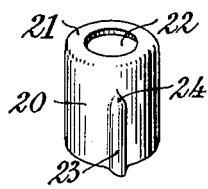
Fig.1.
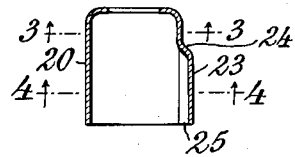
Fig.2.
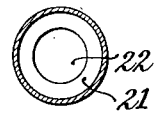
Fig.3.
Fig.4.
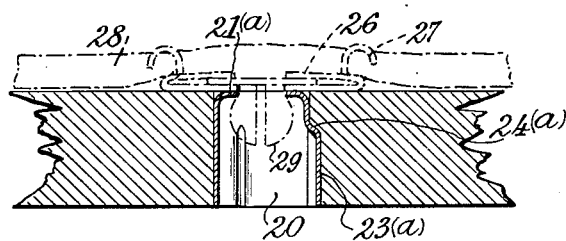
Fig.8.
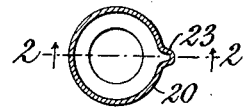
Fig.5.
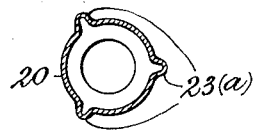
Fig.6.
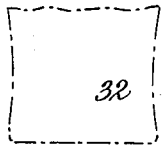
Fig.9.
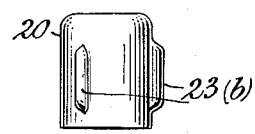
Fig.7.
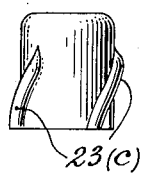
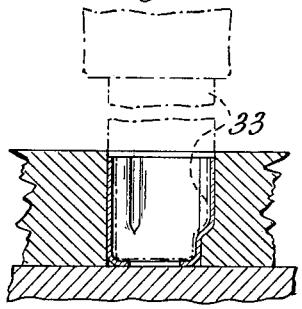
Fig.10.
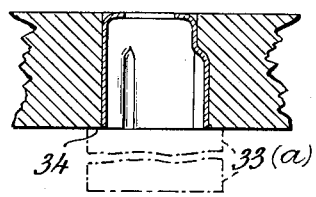
Fig.11.
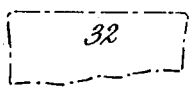
Inventor
Edmund D. Janes,
By his Attorneys
Proser, Myers & Manley.

Patented Jan. 2, 1934

1,942,171

UNITED STATES PATENT OFFICE 1,942,171

SEPARABLE SNAP FASTENER SOCKET

Edmund D. Janes, Waterbury, Conn., assignor to Scovill Manufacturing Company, Waterbury, Conn., a corporation of Connecticut Application February 6, 1932. Serial No. 591,433

8 Claims. (Cl. 24—208)

This invention relates to improvements in sockets of the type adapted to receive the stud element of a separable snap fastener. It is designed for use under those conditions of service in accordance with which it is found desirable to mount the socket element of the fastener in a supporting member of relatively rigid but slightly compressible material such as wood. It is therefore peculiarly adapted for use as a floor socket.

It is an object of the invention to produce a relatively simple and inexpensive socket of the above-described character which can be readily secured in a piece of wooden flooring without the aid of special tools or the services of skilled workmen, the socket being one which may be applied by merely boring a cylindrical hole in the flooring and then driving the socket into the hole by a few taps of a hammer.

In the accompanying drawing illustrating preferred forms of the invention:—

Figure 1 is a perspective view of a socket embodying the invention ready to be inserted in a piece of flooring.

Fig. 2 is a longitudinal sectional view through the socket illustrated in Fig. 1, the section being taken along the line 2—2 of Fig. 4.

Fig. 3 is a transverse sectional view of the socket illustrated in Fig. 2, the section being taken along the line 3—3 thereof.

Fig. 4 is a transverse sectional view of the socket illustrated in Fig. 2, the section been taken along the line 4—4 thereof.

Fig. 5 is a transverse sectional view of a socket embodying the invention in modified form.

Figs. 6 and 7 are side views of sockets embodying the invention in modified form.

Fig. 8 is a transverse sectional view through a piece of flooring with a socket embodying the invention mounted therein, and in which the broken lines represent a fastener stud in engagement with the socket.

Fig. 9 is a similar transverse sectional view of a piece of flooring and a socket partly driven into an opening in the same by a hammer a portion of which is represented in broken lines.

Fig. 10 is a similar transverse sectional view of a piece of flooring with a socket embodying the invention mounted therein by the aid of tools represented in broken lines.

Fig. 11 is another transverse sectional view through a piece of flooring representing the manner in which the socket may be mounted in a floor which has been already laid.

Figs. 1 to 4, inclusive, of the drawing illustrate one form of the improved socket comprising a tubular structure 20, preferably made of appropriate metal, of substantially uniform shape and size in cross-section, although it may be slightly tapered in order that it may serve as a wedge of very gentle slope. Preferably the socket will be a hollow structure of circular form in cross-section and should be provided with an orifice at one end to receive the stud of a fastening element and with means for engaging and retaining such stud. A simple form of stud-engaging element may be provided by merely turning the tubular structure inwardly at one end to produce an annular flange 21 surrounding an opening 22 to receive the stud.

As will be hereinafter more clearly explained, the socket may be mounted in a piece of wooden flooring by merely boring a hole of a diameter substantially equal to that of the socket and then driving the socket into the hole, by using the stud-engaging end as the leading end and driving from the under side of the flooring towards the surface.

In order that the socket may be firmly held in place by the flooring and not detached by a pull exerted when withdrawing a stud from the socket, it should be provided with appropriate anchoring means to be buried in the material surrounding the mounted socket when driven into its assembled relation with respect thereto. One suitable form of anchoring means illustrated in Figs. 2 and 4 may comprise an external rib 23 projecting outwardly from the outer surface of the socket. This rib, which should be a substantially rigid part of the structure, may be readily formed by expanding and crimping a portion of the socket wall, as best indicated in Fig. 4.

Preferably the rib should be of shorter length than the socket and terminate at a distance from its stud-receiving end as at 24, thus forming a shoulder adapted to prevent the withdrawal of the socket from its opening in the flooring in which it is mounted, and to give the best results the leading end of the rib 23 should be tapered as indicated at 24 to adapt the socket to be driven into the material of the structure in which it is used. If desired, the rib may extend from the shoulder 24 to the lower or rear end of the socket as at 25.

In Fig. 5 is illustrated a modified form of the invention which differs from the one previously disclosed in that it has three anchoring ribs 23(a) instead of the single rib 23 of Figs. 1 to 4, inclusive. In Figs. 6 and 7 are illustrated other modified forms of the invention. The form illustrated in Fig. 6 differs from that illustrated in Fig. 5 in that the ribs 23(b) do not extend to the extreme rear end or base of the socket, and the form of the invention illustrated by Fig. 7 differs from any of those previously disclosed in that the ribs 23(c) are indicated as of a gradual spiral form instead of being parallel with the axis of the socket.

In Fig. 8 is illustrated a view in cross-section through a piece of flooring with one of the improved sockets mounted therein. The socket is represented as having been driven into the flooring until its upper end is flush with the surface of the floor, the ribs 23(a) being firmly embedded in the woodwork surrounding the socket. A complemental fastening element 26 secured by attaching prongs 27 to a piece of carpet 28 and having an expansible stud element 29 to engage the flange 21(a) at the upper end of the socket is represented in broken lines.

The unintentional withdrawal of the socket from the flooring when detaching the stud is prevented by the shoulders 24(a) at the upper ends of the ribs 23(a).

In Fig. 9 is illustrated one simple and practical manner of mounting the socket in the flooring which may be used whenever conditions are such that the socket may be assembled with the flooring before the latter is laid in the floor. Under such circumstances the desired position of the socket in the flooring is determined upon, and a cylindrical hole 30 is made to receive the socket. The piece of flooring is then laid upon some flat surface 31 with its intended wearing face down, after which the socket is inserted in the opening with its stud-receiving end down and driven to place by means of a few taps of a hammer 32. Should the socket be of slightly greater length than the thickness of the flooring, the operation will be complete when the stud-engaging end of the socket comes in contact with the surface 31. On the other hand, should the socket be of slightly less length than the thickness of the flooring, it may be driven to its final position, as indicated in Fig. 10, after inserting a suitable tool 33 to which may be imparted one or more additional taps of the hammer.

In Figs. 8, 9 and 10, representing the socket in its assembled position in a piece of flooring and the method of mounting it in such assembled position, we have illustrated the specific form of socket indicated by Fig. 5, but it will be apparent that any of the other modified forms of socket might be mounted in the flooring in exactly the same manner.

When the socket is to be mounted in a floor which has been already laid and in which the flooring is accessible from below, the socket may be driven upwardly from the under surface of the flooring, as indicated in Fig. 11, by means of a tool 33(a) and hammer 32. The tool 33(a) may be provided with a shoulder 34 so positioned as to come in contact with the under surface of the flooring when the upper end of the socket is flush with the upper surface of the floor.

As represented in Figs. 10 and 11, parts of the inserting tools 33, 33(a), are indicated as having been broken away. They should, however, be of such length as to afford the necessary grip to withdraw them from the sockets after the latter have been inserted.

The invention is not intended to be limited to the specific forms which have been selected for purposes of illustration, but should be regarded as including other modifications and variations thereof within the scope of the appended claims.

What is claimed is:—

1. A snap fastener socket adapted to be driven endwise into an opening in a structural element in which it is to be mounted, said socket having a stud-receiving orifice and stud-engaging means at its leading end and integral, rigid, preformed anchoring means extending outwardly beyond its external surface which is otherwise of a substantially uniform external, cross-sectional shape and size from end to end, the leading portion of the anchoring means being positioned intermediate the ends of the socket and directed towards its stud-receiving end and being of such form and strength as to adapt the anchoring means to be driven into and embedded in the material surrounding the socket as the socket is driven into the structural element with its stud-receiving end leading.

2. A snap fastener socket, as defined by claim 1, of which the anchoring means comprises a rib having one end intermediate the ends of the socket and the other end at a greater distance from the stud-receiving end of the socket.

3. A snap fastener socket, as defined by claim 1, of which the anchoring means comprises a longitudinally-extending rib.

4. A snap fastener socket, as defined by claim 1, of which the anchoring means comprises a plurality of spaced, longitudinally-extending ribs.

5. A snap fastener socket, as defined by claim 1, of which the anchoring means comprises a longitudinally-extending rib having one end spaced from the stud-receiving end of the socket and the other end coincident with the opposite end of the socket.

6. A substantially tubular snap fastener socket adapted to be driven endwise into an opening in a structural element in which it is to be mounted, said socket having an inturned stud-retaining flange surrounding a stud-receiving orifice at its leading end and integral, rigid, preformed anchoring means of elongated form extending outwardly beyond its external surface, the leading portion of the anchoring means being positioned intermediate the ends of the socket and directed towards its stud-receiving end and being of such form and strength as to adapt the anchoring means to be driven into and embedded in the material surrounding the socket as the socket is driven into the structural element with its stud-receiving end leading.

7. A snap fastener socket, as defined by claim 6, of which the anchoring means comprises a single rib of material expanded and crimped outwardly from a portion of the wall of the socket.

8. A snap fastener socket, as defined by claim 6, of which the anchoring means comprises a plurality of parallel, spaced ribs of material expanded and crimped outwardly from portions of the wall of the socket.

EDMUND D. JANES.